United States Patent
Adusumilli

(10) Patent No.: US 6,438,700 B1
(45) Date of Patent: Aug. 20, 2002

(54) SYSTEM AND METHOD TO REDUCE POWER CONSUMPTION IN ADVANCED RISC MACHINE (ARM) BASED SYSTEMS

(75) Inventor: Swaroop Adusumilli, Tempe, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/313,933

(22) Filed: May 18, 1999

(51) Int. Cl.⁷ .................................................. G06F 1/32
(52) U.S. Cl. ...................................... 713/323; 713/322
(58) Field of Search ................................ 713/300–340, 713/600–601

(56) References Cited

U.S. PATENT DOCUMENTS

| | | | |
|---|---|---|---|
| 5,392,437 A | | 2/1995 | Matter et al. ................ 395/750 |
| 5,420,808 A | * | 5/1995 | Alexander et al. ........... 713/321 |
| 5,452,401 A | * | 9/1995 | Lin ............................. 713/321 |
| 5,655,124 A | | 8/1997 | Lin ........................ 395/750.04 |
| 5,666,537 A | | 9/1997 | Debnath et al. ........ 395/750.04 |
| 5,790,877 A | * | 8/1998 | Nishiyama et al. .......... 713/323 |
| 5,815,724 A | * | 9/1998 | Mates ......................... 713/322 |
| 5,987,616 A | * | 11/1999 | Suzuki ........................ 713/320 |
| 5,996,083 A | * | 11/1999 | Gupta et al. ................. 713/322 |
| 6,014,751 A | * | 1/2000 | Kardach et al. ............. 713/324 |
| 6,035,315 A | * | 3/2000 | Krick .......................... 708/490 |
| 6,049,882 A | * | 4/2000 | Paver ........................... 713/322 |
| 6,219,796 B1 | * | 4/2001 | Bartley ........................ 713/320 |

OTHER PUBLICATIONS

"ARM10 Thumb Family" ARM Product Overview, Online! Nov. 1998, XP002143886. Retrieved from the Internet: <URL:http://www.arm.com/Documentation/Overviews/pdf/DVI0014A.pdf>, retrieved on Jul. 28, 2000! page 3, left–hand column, paragraph 1; page 3, middle column, paragraph 2; page 4, middle column, paragraph 3; page 6–9.

* cited by examiner

Primary Examiner—Sumati Lefkowitz
(74) Attorney, Agent, or Firm—Peter Zawilski

(57) ABSTRACT

The present invention is an ARM coprocessor power reduction system and method that turns off a coprocessor clock when an ARM system is performing THUMB state instructions. For example, the ARM coprocessor power reduction system and method of the present invention tracks signals from the ARM core periphery to determine if the ARM core is attempting to facilitate ARM state or THUMB state operations. The present invention compares the THUMB bit indicator in signals associated with each stage of an ARM pipeline and determines if the instructions are THUMB state instructions. If the instructions are THUMB state instructions the ARM coprocessor power reduction system and method of the present invention turns off the coprocessor clock. Turning off the coprocessor clock prevents the coprocessor registers from switching and consuming power. If an instruction fetched into an ARM pipeline is an ARM state instruction the ARM coprocessor power reduction system and method of the present invention turns the coprocessor clock back on.

12 Claims, 5 Drawing Sheets

| WAIT_N_PF | OPC_N_PF | OPC_N | MREQ_N | DHOLD | DECODE | EXECUTE |
|---|---|---|---|---|---|---|
| 0 | X | X | X | HOLD | HOLD | HOLD |
| X | 1 | 1 | X | HOLD | HOLD | HOLD |
| X | 1 | X | 1 | HOLD | HOLD | HOLD |
| 1 | 0 | 0 | 0 | HOLD | DIN | DECODE |
| 1 | 0 | 1 | X | DIN | HOLD | HOLD |
| 1 | 1 | 0 | 0 | HOLD | DHOLD | DECODE |

FIG. 4

SYSTEM AND METHOD TO REDUCE POWER CONSUMPTION IN ADVANCED RISC MACHINE (ARM) BASED SYSTEMS

The present invention relates to the field of computer processing systems and methods. More particularly, the present invention relates to a system and method to improve power consumption in Advanced RISC Machines (ARM) based systems by turning off certain features when operating in THUMB state.

BACKGROUND OF THE INVENTION

Computer systems and circuits have made a significant contribution towards the advancement of modem society and are utilized in a number of applications to achieve advantageous results. Computer systems typically include a processor that operates in accordance with a set of instructions. Numerous electronic technologies such as digital computers, calculators, audio devices, video equipment, and telephone systems include processors that have facilitated increased productivity and reduced costs in analyzing and communicating data, ideas and trends in most areas of business, science, education and entertainment. Frequently, the processors designed to provide these results are advanced RISC machines (ARM) that operate in accordance with a reduced instruction set computer architecture (RISC). However, ARM machines typically utilize coprocessors that consume significant power even when they are not engaged in supporting current ARM operations.

Typically ARM processors deliver relatively high performance and offer significant flexibility through a very powerful instruction set. The relative simplicity of a typical ARM processor facilitates a high instruction throughput and efficient time interrupt response from a compact and cost effective device. Pipelining is utilized to enable multiple components of the processing and memory systems to operate at the same time. For example, while one instruction is being executed, a subsequent instruction is being decoded, and a third instruction is fetched from memory.

Usually an ARM processor utilizes two states or instruction sets. One state or instruction set includes a 32-bit ARM set and another state or instruction set includes a 16-bit THUMB set. The THUMB set of instructions operates on the same 32-bit registers as the ARM set of instructions and achieves approximately twice the density of the ARM set while maintaining most of the ARM set performance advantages. However, there are some instances in which more functionality and higher performance are required. In these situations a coprocessor is usually included in a system.

An ARM coprocessor provides additional processing power in the ARM state. Often it is advantageous to have the coprocessor executing particular instructions while a main ARM processor is performing other functions. For example a coprocessor often performs functions such as floating point operations, graphics transformations, and image compression. However, in typical ARM systems with coprocessors, some of the coprocessor features are continuously maintained even though the coprocessor is not being utilized to process instructions or information.

Coprocessors usually consume significant amounts of system power even though the coprocessor is not contributing to primary system operations. In particular the coprocessor is not contributing to primary system operations during 16-bit THUMB transactions since a coprocessor is not used to perform 16-bit transactions. The THUMB instruction set is smaller than the ARM instruction set and while operating in the THUMB state the coprocessor in an ARM system is not utilized. Usually the coprocessor continues to consume power even when the coprocessor is not processing instructions or information. For example the clock in the coprocessor continues to run and the coprocessor registers continue to switch state which consumes power.

Reducing power consumption by components that are not contributing to the functionality of an ARM system offers many benefits. For example, power availability is often critical in wireless communication systems that utilize ARM systems to provide processing capabilities. Wireless communication systems often rely on batteries as a power supply and reducing power consumption results in longer battery life. Reducing power consumption also permits battery sizes to be reduced which permits smaller wireless communication devices to be produce. Compact wireless communication devices usually offer greater practical application utility.

What is required is a system and method that reduces power consumption by coprocessors in an ARM system. The system and method should not interfere with the operational functionality of the ARM system. Coprocessor register switching during THUMB state operations should be reduced. The system and method should also facilitate the reduction of power supply requirements.

SUMMARY OF THE INVENTION

The system and method of the present invention reduces power consumption by coprocessors in an ARM system. The system and method does not interfere with the operational functionality of the ARM system. Coprocessor register switching during THUMB state operations is reduced by the present invention and the present invention also facilitates the reduction of power supply requirements.

In one embodiment of the present invention, an ARM coprocessor power reduction system and method detects when an ARM system is engaging in activities that do not utilize an ARM coprocessor and turns off the ARM coprocessor clock. The ARM coprocessor power reduction system and method of the present invention tracks if the ARM core is engaging in ARM state or THUMB state operations. For example, ARM coprocessor power reduction system and method analyzes a THUMB bit (TBIT) signal that indicates whether the ARM core is performing in an ARM state or THUMB state. If the ARM core is engaging in THUMB state operations the ARM coprocessor power reduction system and method of the present invention instructs a coprocessor clock to turn off. If the ARM core is engaging in ARM state operations the ARM coprocessor power reduction system and method of the present invention instructs a coprocessor clock to turn on.

BRIEF DESCRIPTION OF THE DRAWINGS

FIG. 4 is an illustration of an ARM coprocessor power reduction truth table for an ARM coprocessor power reduction system of the present invention.

DETAILED DESCRIPTION OF THE INVENTION

Figure 1:
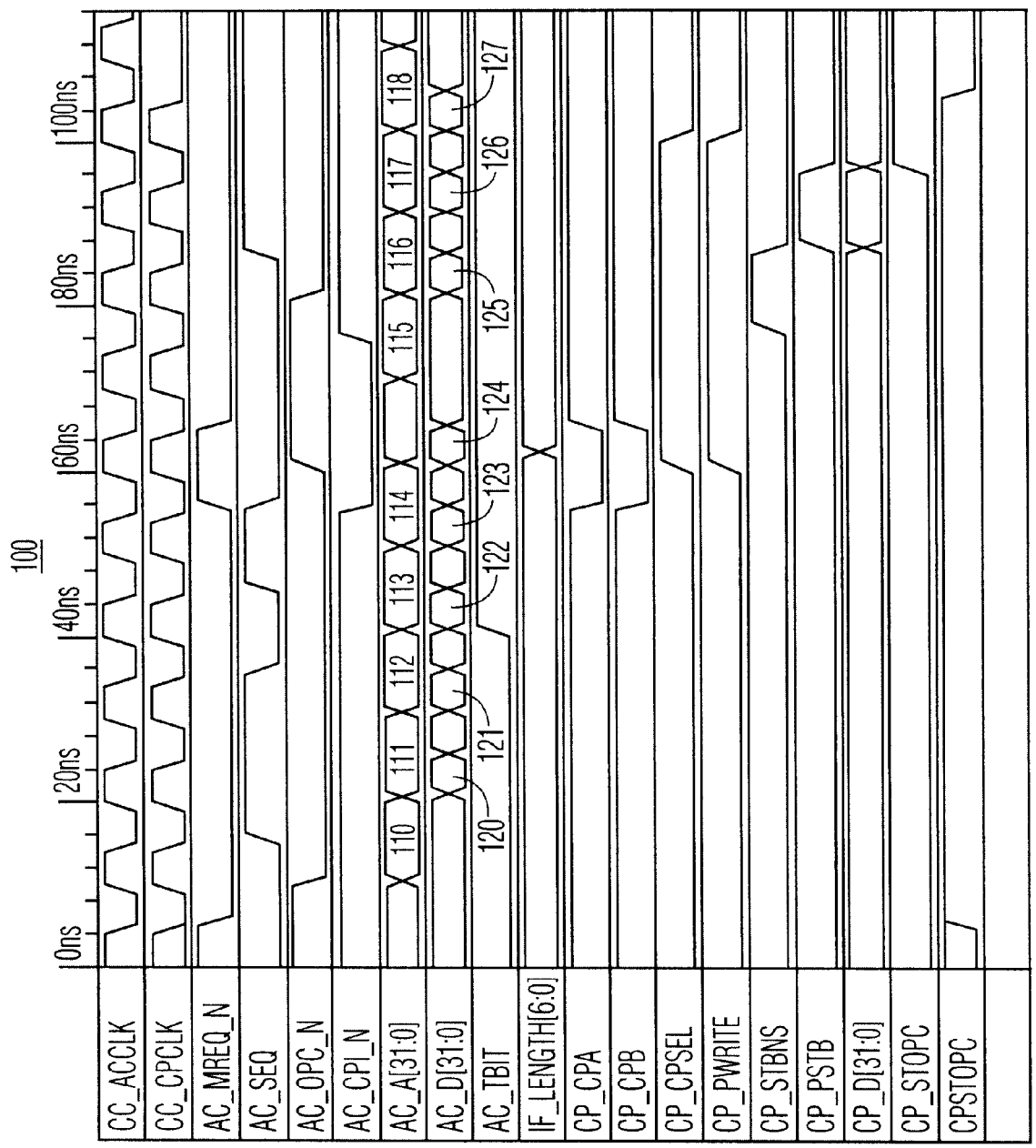
FIG. 1 is one example of a coprocessor clock stop waveform table associated with one embodiment of an ARM coprocessor power reduction system and method of the present invention.

Reference will now be made in detail to the preferred embodiments of the invention, a system and method to reduce power consumption in advanced RISC machine (arm) based systems, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is an ARM coprocessor power reduction system and method that detects when an ARM system is engaging in activities that do not utilize an ARM coprocessor and turns off the ARM coprocessor clock. For example, the ARM coprocessor power reduction system and method of the present invention tracks signals from the ARM core periphery to determine if the ARM core is attempting to facilitate ARM state or THUMB state operations. If the ARM coprocessor power reduction system and method of the present invention detects that the ARM core is attempting to facilitate THUMB state operations the ARM coprocessor power reduction system and method signals a clock associated with the ARM coprocessor to turn off. Since the ARM coprocessor clock is turned off the registers in the ARM coprocessor are not switching and consuming power. If the ARM coprocessor power reduction system and method of the present invention senses the ARM core is attempting to facilitate ARM state operations the ARM coprocessor power reduction system and method signals a clock associated with the ARM coprocessor to turn on.

As instructions are processed by the ARM core, they are also captured by an ARM pipeline that includes three stages. The ARM pipeline comprises a fetch stage, a decode stage and an execute stage. The ARM coprocessor power reduction system of the present invention tracks what stage a particular instruction is at in the ARM core (whether it is in fetch, decode or execute stage). Whenever there is a change in state of operation (e.g., a change from ARM state to THUMB state or vice versa) an instruction indicating the change flows though the ARM pipeline. The instruction is fetched, decoded and then in the execute stage the ARM core determines if the instruction is directing the ARM core to switch to a 16 bit THUMB instruction set or the 32 bit ARM instruction set. When a state change instruction gets executed a TBIT (THUMB Bit) signal will change. For example, TBIT changes from a logical zero to a logical one when the instruction is a THUMB state instruction or from a logical one to a logical zero when the instruction is an ARM state instruction.

Even though the state change instruction gets executed there are potentially two more operations to get executed pending in the pipeline, one operation in the fetch stage and one operation in the decode stage. If the operation state is changing from ARM state to THUMB state the ARM coprocessor power reduction system and method does not power off the ARM coprocessor clocks until the remaining two operations in the decode and execute stage are fully executed. Thus, if the remaining two operations in the decode stage and execute stage include ARM state operations the coprocessor has its clocks running and available to continue processing 32 bit ARM state operations.

FIG. 1 is one example of a coprocessor clock stop waveform table 100 associated with one embodiment of an ARM coprocessor power reduction system and method of the present invention. Coprocessor clock stop waveform table 100 illustrates when first ARM instruction 110, second ARM instruction 111 and third ARM instruction 112 and their corresponding first ARM data transfer 120, second ARM data transfer 121 and third ARM data transfer 123 are fetched, the value in a CPSTOPC register is high indicating the coprocessor clock is running. When first THUMB instruction 113 is fetched signal AC_TBIT transitions from a logical zero (low) to a logical one (high). However, signal CP_STOPC does not switch a logical zero (instructing the coprocessor clock to continue running) to a logical one (instructing the coprocessor clock to stop running). Signal CP_STOPC does not transition until second THUMB instruction 114 and third THUMB instruction 116 and their associated second THUMB data transfer 124 and third THUMB data transfer 126 are complete. Signal CP_STOPC even senses the extended processing duration indicated by the coprocessor absent instruction 115 and its associated coprocessor absent data transaction 125 between second THUMB data transfer 124 and third THUMB data transfer 126. The AC_TBIT signal remains at a logical one (high) for forth THUMB instruction 117, fifth THUMB instruction 118 and forth THUMB data transfer 127.

When an ARM system is exiting the THUMB state and going to the ARM state the TBIT signal will indicate (e.g., go low) it is processing ARM state operations. The coprocessor clock starts during the same cycle when the ARM system is exiting the THUMB state and going to the ARM state. Thus, the coprocessor is available to continue processing 32 bit ARM state operations if the next instruction that gets executed is a 32 bit ATM state operation.

Figure 2:
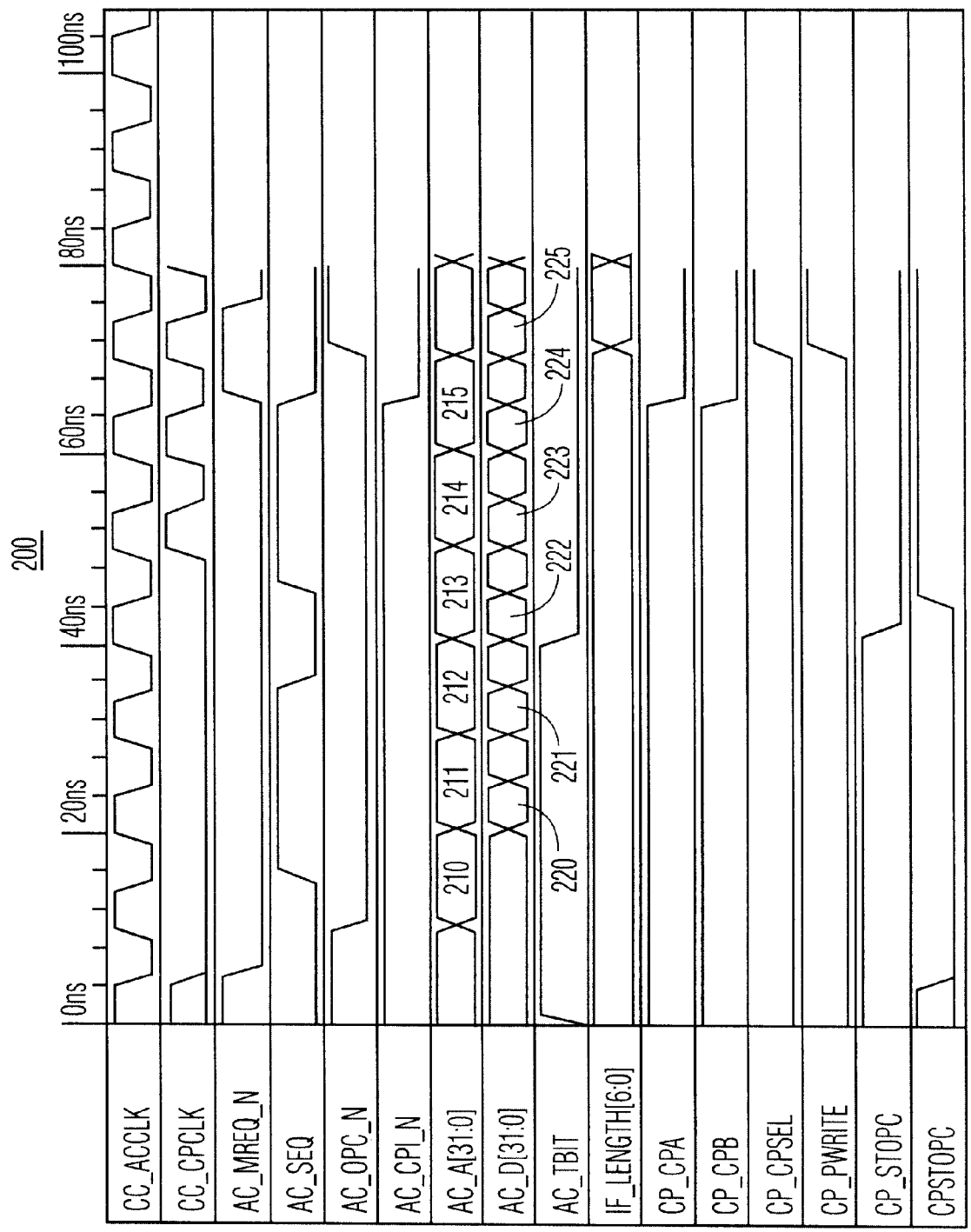
FIG. 2 is one example of a coprocessor clock start waveform table associated with one embodiment of an ARM coprocessor power reduction system and method of the present invention.

FIG. 2 is one example of a coprocessor clock start waveform table 200 associated with one embodiment of an ARM coprocessor power reduction system and method of the present invention. Coprocessor clock stop waveform table 200 illustrates when first THUMB instruction 210, second THUMB instruction 211 and third THUMB instruction 212 and their corresponding first THUMB data transfer 220, second THUMB data transfer 221 and third THUMB data transfer 223 are fetched, the value in a CPSTOPC register is low indicating the coprocessor clock is not running. When first ARM instruction 213 is fetched signal AC_TBIT transitions from a logical one to a logical zero. Signal CP_STOPC transitions from a logical one to a logical zero instructing the coprocessor clock to start running. The value in the CPSTOPC register transitions from a logical zero to a logical one indicating the clock started running. The value in the CPSTOPC register remains at a logical one for second ARM instruction 214, third ARM instruction 215, first ARM data transfer 223, second ARM data transfer 224 and third ARM data transfer 225.

The ARM core utilizes several signals to indicate progress and advancement through the stages of the ARM coprocessor pipeline follower. The not memory request signal (MREQ_N or nMREQ) indicates whether a memory access is required in the next cycle. If NMREQ is low the ARM core processor requires a memory access in the next cycle. The not op-code fetch signal (OPC_N or nOPC) indicates whether an ARM core processor is fetching an instruction from memory. If OPC_N is low the ARM core processor is fetching an instruction from memory and if OPC_N is high data is being transferred (if there is data present). The not wait (WAIT_N or nWAIT) signal is utilized to cause an ARM core to wait or stall for an integer number of memory clock input (MCLK) cycles. MCLK is a clock that times ARM core memory accesses and internal operations. When WAIT_N is low the ARM core waits or is stalled.

Figure 3:
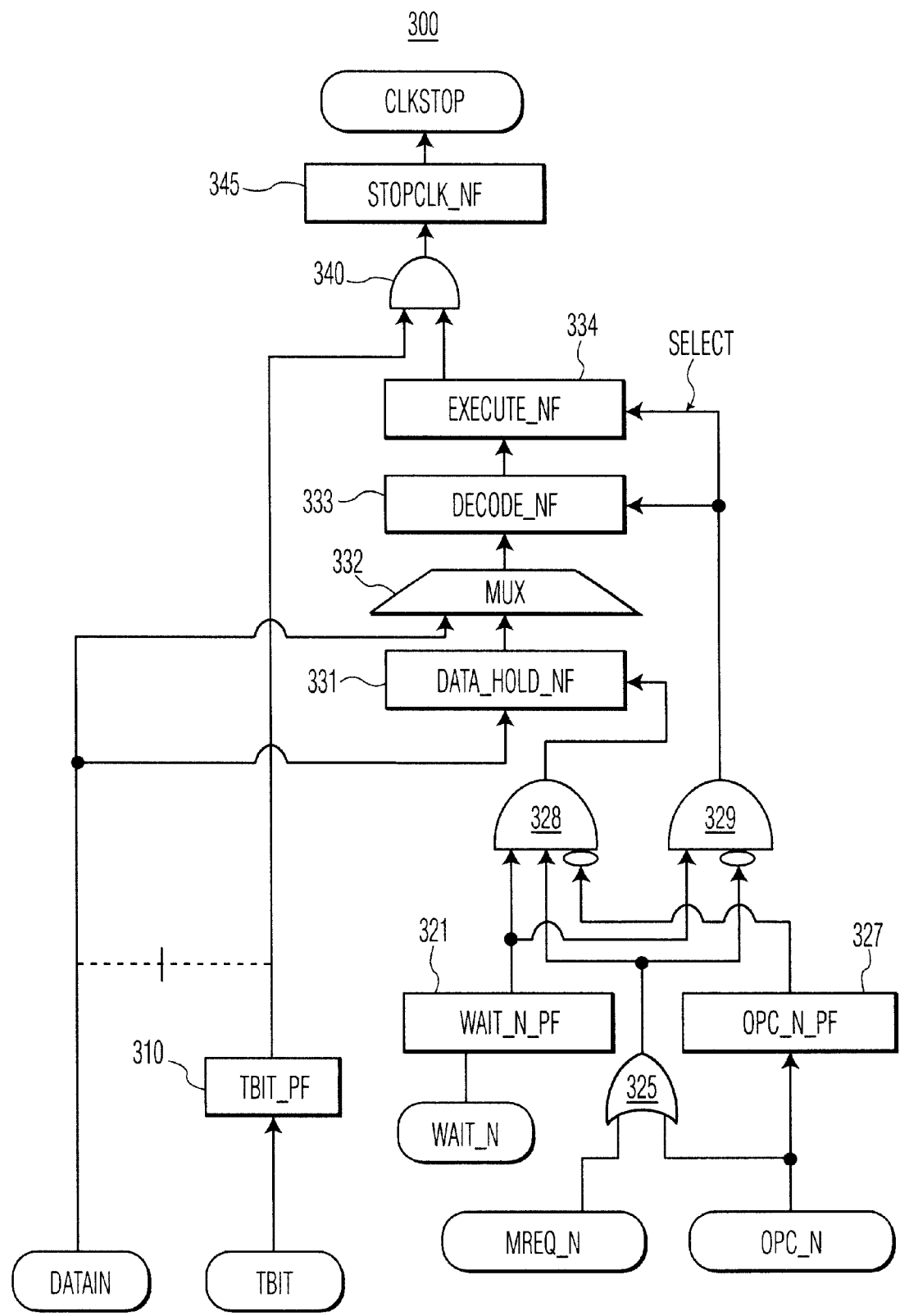
FIG. 3 is a schematic of an ARM coprocessor power reduction system, one embodiment of the present invention.

FIG. 3 is a schematic of ARM coprocessor power reduction system 300, one embodiment of the present invention. ARM coprocessor power reduction system 300 comprises THUMB bit register TBIT_PF 310, wait register WAIT_N_PF 321, first logic OR component 325, not op-code fetch register OPC_N_PF 327, third logic AND component 328, second logic AND component 329, data hold register DATA_HOLD_NF 331, multiplexer MUX 332, decode register DECODE_NF 333, execute register EXECUTE_NF 334, first logic AND component 340 and stop clock register STOPCLK_NK 345. Registers that include a PF in their identification comprise flip flops triggered by a positive going edge of a signal and registers that include a NF in their identification comprise flip flops triggered by a negative going edge of a signal. TBIT_PF 310 is coupled to first logic AND component 340. Third logic AND component 328 is coupled to WAIT_N_PF 321, first logic OR component 325, OPC_N_PF 327, and DATA_HOLD_NF 331. Second logic AND component 329 is coupled to WAIT_N_PF 321, first logic OR component 325, OPC_N_PF 327, DECODE_NF 333, and EXECUTE_NF 334. MUX 332 is coupled to DATA_HOLD_NF 331 and DECODE_NF 333 which is coupled to EXECUTE_NF 334. EXECUTE_NF 334 is coupled to first logic AND component 340 which is coupled to STOPCLK_NF 345.

The components of ARM coprocessor power reduction system 300 cooperatively operate to forward ARM instructions through an ARM pipeline and initiate a signal to turn off a coprocessor clock if the ARM pipeline is processing THUMB state instructions. First logic AND component 340 is adapted to logically analyze input signals and provide a signal that turns on or off a coprocessor clock based upon the state of instructions in an ARM pipeline. For example, first logic AND component 340 provides a signal that turns off the coprocessor clock if instructions in the ARM pipeline are THUMB state instructions and turns on the coprocessor clock if an instruction in the ARM pipeline is an ARM state instruction. THUMB bit register TBIT_PF 310 stores a logical value of a THUMB bit (TBIT) signal that indicates whether an instruction in an ARM pipeline is operating in a THUMB state or ARM state. Execute register EXECUTE_NF 334 stores information associated with an execution stage of said ARM pipeline.

Second logic AND component 329 controls advancement of instructions and data through the ARM pipeline. Logic OR component 325 transmits a logical one value if an input (e.g., a not memory request signal (MREQ_N and a not op-code fetch signal OPC_N) to logic OR component 325 is a logical 1 and a logical zero if said input to logic OR component 325 is a logical zero. Wait register WAIT_N_PF 321 captures a value of a not wait signal (e.g., WAIT_N).

Third logic AND component 328 transmits a signal directing stored data to be forwarded in the ARM pipeline. Data hold register DATA_HOLD_NF 331 stores data waiting to be processed in the ARM pipeline. Not op-code fetch register OPC_N_PF 327 stores the status of a not op-code fetch signal that indicates whether an ARM core processor is fetching an instruction from memory. Decode register DECODE_NF 333 stores information associated with a decode stage of the ARM pipeline. Multiplexer MUX 332 selects a signal to transmit to said decode register, such as a signal from a data hold register or from a data in signal.

ARM instruction pipeline logic examines the information in WAIT_N_PF 321, and logical status of signals OPC_N and MREQ_N to determine when to latch instructions from an ARM system data bus through various ARM core registers. TBIT value from the previous rising edge is sampled and sent along with the data which is moving towards decode and execute stages. This enables ARM coprocessor power reduction system 300 to properly start/stop the coprocessor clock.

FIG. 4 is an illustration of ARM coprocessor power reduction truth table 400. ARM coprocessor power reduction truth table 400 is the truth table for ARM coprocessor power reduction system 300. In one embodiment of the present invention, if the output of WAIT_N_PF is a logical one, OPC_N signal is a logical zero and MREQ_N signal is a logical zero at the rising edge of the clock, then the ARM core is fetching an instruction. The instruction itself is put on the ARM core data bus at the following falling edge of the clock. The instruction remains on the ARM core data bus and no instructions are moved between DATA_HOLD_NF 331, multiplexer MUX 332, decode register DECODE_NF 333, or execute register EXECUTE_NF 334 if the value stored in WAIT_N_PF is a logical zero. No instructions are moved between DATA_HOLD_NF 331, multiplexer MUX 332, decode register DECODE_NF 333, or execute register EXECUTE_NF 334 if the value stored in register OPC_N_PF 327 is a logical one and the signal OPC_N or signal MREQ_N is a logical one. If the value in WAIT_N_PF 321 is a logical one and either the OPC_N signal is a logical one or the MREQ_N signal is a logical one at the falling edge of the clock, the ARM core does not move the current instruction through the decode stage and execute stage. However, it continues with data processing if data is present. If the information in OPC_N_PF is a logical 0, then the instruction on the ARM data bus is put in DATA_HOLD_NF 331 and is in an "on-hold" status.

During the remaining states of ARM coprocessor power reduction truth table 400 instructions are moving through stages of the pipeline. If the information in WAIT_N_PF 321 is a logical one and the OPC_N signal is a logical zero and the MREQ_N signal is a logical zero at the falling edge of the clock, the ARM core moves a current instruction to the decode stage. The status of the information in OPC_NPF 327 determines which instruction is moved to the decode stage. If the information in OPC_N_PF 327 is a logical one then the instruction in DATA_HOLD_NF 331 is moved to the decode stage because the instruction in DATA_HOLD_NF 331 didn't go through decode stage yet. If the information in OPC_N_PF 327 is a logical zero, then the instruction on the ARM data bus is put in REGISTER DECODE_NF 333 for decoding. If the value in WAIT_N_PF 321 is a logical 1 and signal OPC_N is a logical zero and signal MREQ_N is a logical zero at the falling edge of the clock, the contents of register DECODE_NF 333 flows to register EXECUTE_NF 334 for execution.

First logic AND component 340 transmits a logical one value if its inputs, the value stored in TBIT_PF 310 and the TBIT of the value stored in EXECUTE_NF 343 are a logical one and a logical zero value if any of the inputs are a logical zero value. The logical values transmitted by First logic AND component 340 are temporarily stored in STOPCLK_NF 345 and then forwarded as signal CLK-STOP to the coprocessor clock. If CLKSTOP is a logical one the coprocessor clock is stopped and if CLKSTOP is a logical zero the coprocessor is started.

Figure 5:
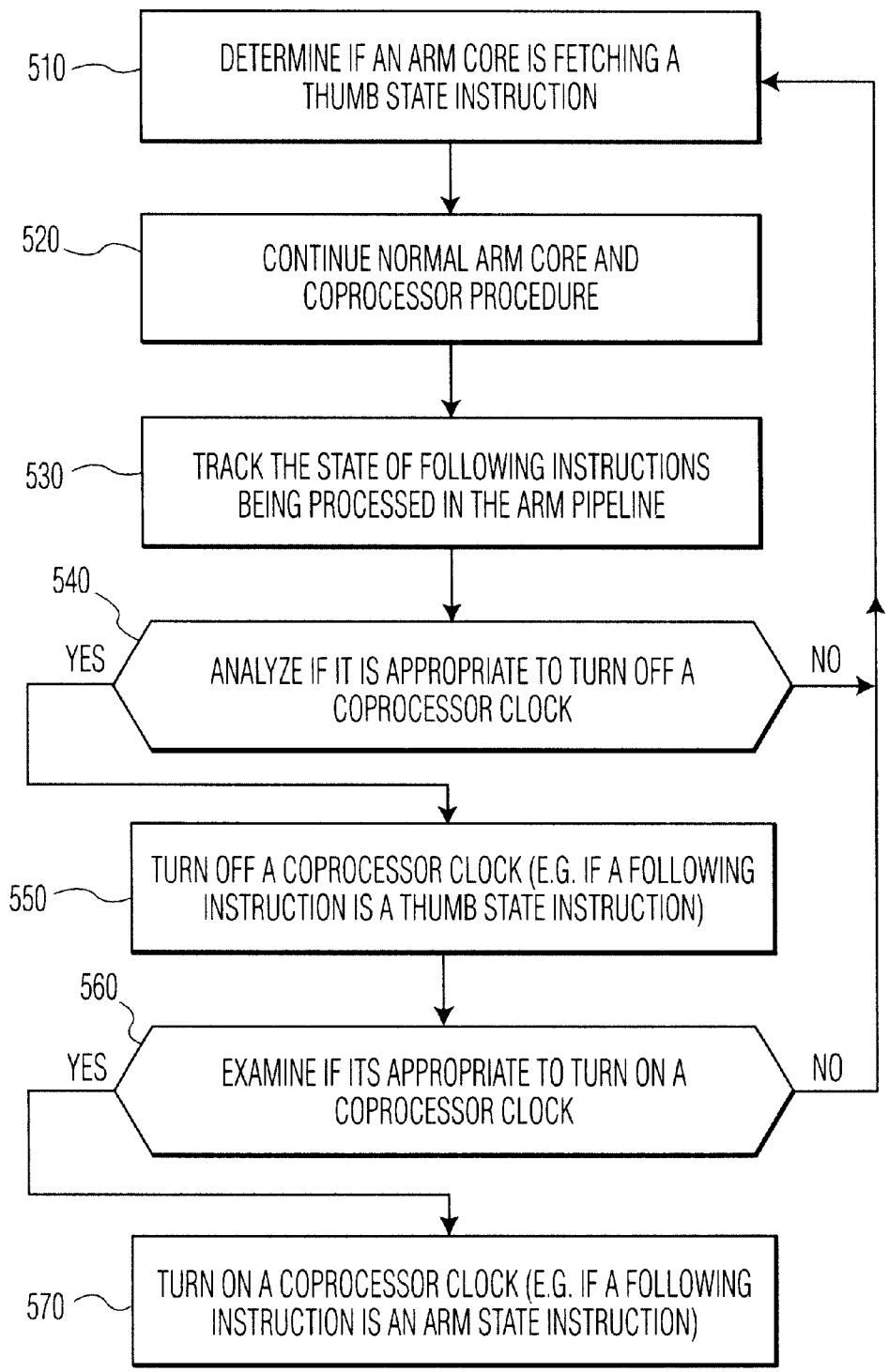
FIG. 5 is a flow chart of one embodiment of an ARM coprocessor power reduction method of the present invention.

FIG. 5 is a flow chart of ARM coprocessor power reduction method 500, one embodiment of the present invention. ARM coprocessor power reduction method 500 establishes if an ARM system is engaging in activities that do not utilize an ARM coprocessor and reduces power consumption by the ARM coprocessor. In one embodiment, ARM coprocessor power reduction method 500 inspects signals from an ARM core periphery to determine if the ARM core is attempting to facilitate ARM state or THUMB state operations. If ARM coprocessor power reduction method 500 detects the ARM core is attempting to facilitate THUMB state operations, ARM coprocessor power reduction method 500 signals a clock associated with the ARM coprocessor to turn off. For example, if ARM coprocessor power reduction method 500 establishes that the series of instructions in an ARM pipeline are all THUMB state operations ARM coprocessor power reduction method 500 causes the coprocessor clock to turn off. Since the ARM coprocessor clock is turned off the registers in the ARM coprocessor are not switching and consuming power.

In Step 510 ARM coprocessor power reduction method 500 determines if an ARM core is fetching a THUMB state instruction. In one embodiment, ARM coprocessor power reduction method 500 checks if the ARM processor is engaging in an instruction fetch. If an instruction is being fetched, ARM coprocessor power reduction method 500 captures the logical state of a TBIT signal associated with the instruction being fetched. For example, ARM coprocessor power reduction method 500 scans a not memory request signal (MREQ_N or nMREQ), a not op-code fetch signal (OPC_N or nOPC) and a not wait signal (WAIT_N or nWAIT) to determine if an ARM core is fetching an instruction. In one example a logical zero (low) TBIT signal indicates an ARM state instruction and a logical one (high) TBIT signal indicates a THUMB state instruction. After ARM coprocessor power reduction method 500 determines if the ARM core is fetching a THUMB state instruction, ARM coprocessor power reduction method 500 proceeds to Step 520.

ARM coprocessor power reduction method 500 continues normal ARM core and coprocessing procedures in Step 520 ARM. In one example, ARM coprocessor power reduction method 500 continues normal ARM core and coprocessing procedures by moving an instruction from the fetch stage to the decode stage and advancing the instruction on to the execution stage.

In Step 530 ARM coprocessor power reduction method 500 tracks the state of following instructions being processed in the ARM pipeline. In one embodiment of ARM coprocessor power reduction method 500 stores the logical value of a TBIT signal in a TBIT register (e.g., TBIT_PF 210). In one example the TBIT value is stored when an instruction is moved from the fetch stage into the decode stage of the pipeline.

In Step 540 ARM coprocessor power reduction method 500 analyzes if it is appropriate to turn off a coprocessor clock. In one embodiment of ARM coprocessor power reduction method 500 it is appropriate to turn off a coprocessor clock if ARM coprocessor power reduction method 500 establishes the instructions being processing in an ARM pipeline are THUMB state instructions or data associated with a THUMB state instruction. For example, if THUMB state instruction or data associated with the THUMB state instructions are occupying the stages of the ARM pipeline it is appropriate to turn off the coprocessor clock. If it is not appropriate to turn off a coprocessor clock ARM coprocessor power reduction method 500 loops back to step 520. If it is appropriate to turn off a coprocessor clock ARM coprocessor power reduction method 500 proceeds to step 550.

In Step 550 ARM coprocessor power reduction method 500 turns off the coprocessor clock. In one embodiment of the present invention ARM coprocessor power reduction method 500 transmits a signal to the coprocessor clock to stop.

In Step 560 ARM coprocessor power reduction method 500 examines if it is appropriate to turn on a coprocessor clock. In one embodiment of ARM coprocessor power reduction method 500 it is appropriate to turn on a coprocessor clock if ARM coprocessor power reduction method 500 ascertains an instruction in an ARM pipeline is an ARM state instruction or data associated with an ARM state instruction. For example, if an ARM state instruction or data associated with the ARM state instruction is occupying an ARM pipeline register it is appropriate to turn on the coprocessor clock. In one embodiment, ARM coprocessor power reduction method 500 continues to monitor a TBIT signal associated with instruction fetches after the coprocessor clock is turned off. For example, ARM coprocessor power reduction method 500 interprets a TBIT value of logical zero to indicate the associated instruction fetch is an ARM state instruction fetch. If a following fetch is an ARM state instruction then it is appropriate to turn on the coprocessor clock. If it is not appropriate to turn on a coprocessor clock ARM coprocessor power reduction method 500 loops back to step 550. If it is appropriate to turn on a coprocessor clock ARM coprocessor power reduction method 500 proceeds to step 570.

In step 570, ARM coprocessor power reduction method 500 switches on a coprocessor clock and loops back to step 510.

As indicated above, ARM coprocessor power reduction method 500 establishes in step 540 if an instruction being processing in an ARM pipeline are THUMB state instructions or data associated with a THUMB state instruction. In one embodiment of ARM coprocessor power reduction method 500, if a stored wait value (e.g., WAIT_N_PF 221) is a logical one and both an OPC_N signal and a MREQ_N signal are a logical zero, ARM coprocessor power reduction method 500 compares the TBIT associated with an instruction in a pipeline execute register (e.g., EXECUTE_NF 234) and a stored TBIT value in a TBIT register (e.g., TBIT_PF 210). If both the TBIT associated with an instruction in a pipeline execute register (e.g., EXECUTE_NF 234) and a stored TBIT value in the TBIT register (e.g., TBIT_PF 210) are a logical one ARM coprocessor power reduction method 500 stops the coprocessor clock. If either the TBIT associated with an instruction in a pipeline execute register (e.g., EXECUTE_NF 234) or a stored TBIT value in the TBIT register (e.g., TBIT_PF 210) is a logical zero, ARM coprocessor power reduction method 500 does not stop the coprocessor clock.

Thus, the system and method of the present invention reduces power consumption by coprocessors in an ARM system. The system and method does not interfere with the operational functionality of the ARM system. Coprocessor register switching during THUMB state operations is reduced by the present invention and the present invention also facilitates the reduction of power supply requirements.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An ARM coprocessor power reduction system comprising:
   a first logic component adapted to logically analyze input signals and provide a signal that turns on or off a coprocessor clock based upon the state of instructions in an ARM pipeline;
   a THUMB bit register coupled to said first logic component; said THUMB bit register adapted to store a logical value of a THUMB bit (TBIT) signal that indicates whether an instruction in an ARM pipeline is operating in a THUMB state or ARM state;
   an execute register coupled to said first logic component, said execute register adapted to store information associated with an execution stage of said ARM pipeline;
   a second logic component coupled to said execute register, said second logic component adapted to advance said ARM pipeline;
   a logic OR component coupled to said second logic component, said logic OR component adapted to transmit a logical one value if an input to said logic OR component is a logical 1 and a logical zero if said input to said logic OR component is a logical zero; and
   a wait register coupled to said second logic component, said wait register adapted to capture a value of a not wait signal adapted to cause an ARM core to wait or stall for an integer number of memory clock input cycles.

2. The ARM coprocessor power reduction system of claim 1 in which said first logic component provides said signal that turns off said coprocessor clock if instructions in said ARM pipeline are THUMB state instructions.

3. The ARM coprocessor power reduction system of claim 1 in which said first logic component provides said signal that turns on said coprocessor clock if an instruction in said ARM pipeline is an ARM state instruction.

4. The ARM coprocessor power reduction system of claim 1 in which said first logic component is a first logic AND component adapted to transmit a logical one value if inputs to said first logic AND component are a logical one and a logical zero value if any of said inputs to said first logic AND component are a logical zero value.

5. The ARM coprocessor power reduction system of claim 1 in which said logic OR component is coupled to a not memory request signal adapted to indicate if a memory access is required in a following cycle and a not op-code fetch signal adapted to indicate if an ARM core processor is fetching an instruction from a memory.

6. The ARM coprocessor power reduction system of claim 1 further comprising:
   a third logic component coupled to said logic OR component, said third logic component adapted to transmit a signal directing stored data to be forwarded in said ARM pipeline;
   a data hold register coupled to said third logic component, said data hold register adapted to store data waiting to be processed in said ARM pipeline;
   a not op-code fetch register coupled to said third logic component, said not op-code fetch register adapted to store the status of a not op-code fetch signal that indicates whether an ARM core processor is fetching an instruction from memory.

7. The ARM coprocessor power reduction system of claim 1 further comprising:
   a decode register coupled to said second logic component, said decode register adapted to store information associated with an decode stage of an ARM pipeline; and
   a multiplexer coupled to said decode register, said multiplexer adapted to select a signal to transmit to said decode register.

8. The ARM coprocessor power reduction system of claim 7 in which said multiplexer selects between a signal from a data hold register or from a data in signal.

9. An ARM coprocessor power reduction system comprising:
   a first logic AND component adapted to logically analyze input signals and provide a signal that turns on or off a coprocessor clock based upon the logical level of the input signals;
   a THUMB bit register coupled to said first logic component; said THUMB bit register adapted to store a logical value of a THUMB bit (TBIT) signal that indicates whether an instruction in an ARM pipeline is operating in a THUMB state or ARM state;
   an execute register coupled to said first logic component, said execute register adapted to store information associated with an execution stage of said ARM pipeline;
   a second logic AND component coupled to said execute register, said second logic AND component adapted to advance said ARM pipeline;
   a logic OR component coupled to said second logic AND component, said logic OR component adapted to transmit a logical one value if an input to said logic OR component is a logical 1 and a logical zero if said input to said logic OR component is a logical zero; and
   a wait register coupled to said second logic AND component, said wait register adapted to capture a value of a not wait signal adapted to cause an ARM core to wait a stall for an integer number of memory clock input cycles.

10. The ARM coprocessor power reduction system of claim 9 in which said logic OR component is coupled to a not memory request signal adapted to indicate if a memory access is required in a following cycle and a not op-code fetch signal adapted to indicate if said ARM core processor is fetching an instruction from a memory.

11. The ARM coprocessor power reduction system of claim 10 further comprising:
   a third logic AND component coupled to said logic OR component, said third logic AND component adapted to transmit a signal directing stored data to be forwarded in said ARM pipeline;
   a data hold register coupled to said third logic AND component, said data hold register adapted to store data waiting to be processed in said ARM pipeline; and a not op-code fetch register coupled to said third logic AND component, said not op-code fetch register adapted to store the status of a not op-code fetch signal that indicates whether said ARM core processor is fetching an instruction from memory;

a decode register coupled to said second logic AND component, said decode register adapted to store information associated with an execution stage of said ARM pipeline; and a multiplexer coupled to said decode register, said multiplexer adapted to select a signal to transmit to said decode register.

12. The ARM coprocessor power reduction system of claim 11 in which said first logic AND component turns off said coprocessor clock when a THUMB bit associated with an instruction in said execution register is a logical one and a value in said THUMB bit register is a logical one.

* * * * *